(12) United States Patent
Alfano et al.

(10) Patent No.: US 11,649,997 B2
(45) Date of Patent: May 16, 2023

(54) REFRIGERANT LEAK SENSOR POWER CONTROL SYSTEMS AND METHODS

(71) Applicant: Emerson Climate Technologies, Inc., Sidney, OH (US)

(72) Inventors: David Alfano, Sidney, OH (US); Stuart K. Morgan, West Chester, OH (US); Hung M. Pham, Dayton, OH (US); Nathan O. Boyce, Vandalia, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 185 days.

(21) Appl. No.: 17/036,448

(22) Filed: Sep. 29, 2020

(65) Prior Publication Data

US 2022/0099346 A1 Mar. 31, 2022

(51) Int. Cl.
*F25B 49/02* (2006.01)
*F25B 39/00* (2006.01)
*F25B 13/00* (2006.01)

(52) U.S. Cl.
CPC ............ *F25B 49/02* (2013.01); *F25B 13/00* (2013.01); *F25B 39/00* (2013.01); *F25B 2500/222* (2013.01); *F25B 2700/02* (2013.01); *F25B 2700/04* (2013.01); *F25B 2700/15* (2013.01); *F25B 2700/17* (2013.01); *F25B 2700/19* (2013.01); *F25B 2700/2103* (2013.01)

(58) Field of Classification Search
CPC .............. F25B 49/02; F25B 2700/19; F25B 2700/17; F25B 2700/15; F25B 2700/04; F25B 2700/02; F25B 2500/222; F25B 39/00; F25B 13/00
See application file for complete search history.

(56) References Cited

U.S. PATENT DOCUMENTS

2007/0156373 A1* 7/2007 Yamashita ............ F25B 49/005
702/182
2013/0067942 A1* 3/2013 Ochiai .................. F25B 49/005
62/126
(Continued)

FOREIGN PATENT DOCUMENTS

JP           6537714 B2      7/2019
KR    2016 0012795      *   2/2016
(Continued)

OTHER PUBLICATIONS

International Search Report regarding Application No. PCT/US2021/051262 dated Jan. 7, 2021.
(Continued)

*Primary Examiner* — Henry T Crenshaw
(74) *Attorney, Agent, or Firm* — Harness, Dickey & Pierce, P.L.C.

(57) ABSTRACT

A sensor control system includes: a refrigerant leak sensor configured to, when powered, measure an amount of a refrigerant present in air outside of a heat exchanger of a refrigeration system, where the heat exchanger is located within a building that is at least one of heated and cooled by the refrigeration system; and a power control module configured to one of: continuously power the refrigerant leak sensor; and disconnect the refrigerant leak sensor from power when a blower that moves air past the heat exchanger is on.

18 Claims, 5 Drawing Sheets

(56) References Cited

U.S. PATENT DOCUMENTS

| | | | | |
|---|---|---|---|---|
| 2016/0245566 A1* | 8/2016 | Hiraki | .................... | F24F 11/77 |
| 2017/0234592 A1* | 8/2017 | Kawashima | ............ | F24F 13/20 |
| | | | | 62/408 |
| 2018/0259235 A1 | 9/2018 | Delgoshaei | | |
| 2019/0390876 A1 | 12/2019 | Matsuda et al. | | |

FOREIGN PATENT DOCUMENTS

| KR | 20160012795 A | 2/2016 |
|---|---|---|
| KR | 101611310 B1 | 4/2016 |

OTHER PUBLICATIONS

Written Opinion of the ISA regarding Application No. PCT/US2021/051262 dated Jan. 7, 2022.

* cited by examiner

REFRIGERANT LEAK SENSOR POWER CONTROL SYSTEMS AND METHODS

FIELD

The present disclosure relates to refrigerant leak sensors and more particularly to systems and methods for controlling powering of refrigerant leak sensors.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Refrigeration and air conditioning applications are under increased regulatory pressure to reduce the global warming potential of the refrigerants they use. In order to use lower global warming potential refrigerants, the flammability of the refrigerants may increase.

Several refrigerants have been developed that are considered low global warming potential options, and they have an ASHRAE (American Society of Heating; Refrigerating and Air-Conditioning Engineers) classification as A2L, meaning mildly flammable. The UL (Underwriters Laboratory) 60335-2-40 standard, and similar standards, specifies a predetermined (M1) level for A2L (or mildly flammable) refrigerants and indicates that A2L refrigerant charge levels below the predetermined level do not require leak detection and mitigation.

SUMMARY

In a feature, a sensor control system includes: a refrigerant leak sensor configured to, when powered, measure an amount of a refrigerant present in air outside of a heat exchanger of a refrigeration system, where the heat exchanger is located within a building that is at least one of heated and cooled by the refrigeration system; and a power control module configured to continuously power the refrigerant leak sensor and not disconnect the refrigerant leak sensor from power while power is received by the power control module.

In a feature, a sensor control system includes: a refrigerant leak sensor configured to, when powered, measure an amount of a refrigerant present in air outside of a heat exchanger of a refrigeration system, where the heat exchanger is located within a building that is at least one of heated and cooled by the refrigeration system; and a power control module configured to disconnect the refrigerant leak sensor from power when a blower that moves air past the heat exchanger is on.

In further features, the power control module is configured to determine that the blower is on when a current to an electric motor of the blower is greater than a predetermined current.

In further features, the power control module is configured to determine that the blower is on when a voltage applied to an electric motor of the blower is greater than a predetermined voltage.

In further features, the power control module is configured to determine that the blower is on when a speed of an electric motor of the blower is greater than a predetermined speed.

In further features, the power control module is configured to determine that the blower is on when a pressure of air downstream of the heat exchanger is greater than a predetermined pressure.

In further features, the power control module is configured to determine that the blower is on when a temperature of air downstream of the heat exchanger is less than a predetermined temperature during cooling.

In further features, the power control module is configured to determine that the blower is on when a temperature of air downstream of the heat exchanger is greater than a predetermined temperature during heating.

In further features, the power control module is configured to determine that the blower is on when a humidity of air downstream of the heat exchanger is greater than a predetermined humidity.

In further features, the power control module is configured to determine that the blower is on when a flowrate of air through ducts is greater than a predetermined flowrate.

In further features, the power control module is configured to determine that the blower is on when a command to turn the blower on is received.

In further features, the refrigerant is classified as mildly flammable.

In further features, the power control module is configured to connect the refrigerant leak sensor to power when the blower is off.

In further features, the power control module configured to, while the blower is off, connect the refrigerant leak sensor to power for a first predetermined period out of each second predetermined period and to disconnect the refrigerant leak sensor from power for the remainder of each second predetermined period, where the second predetermined period is greater than the first predetermined period.

In a feature, a sensor control system includes a refrigerant leak sensor configured to, when powered, measure an amount of a refrigerant present in air outside of a heat exchanger of a refrigeration system, where the heat exchanger is located within a building that is at least one of heated and cooled by the refrigeration system; and a power control module configured to: connect the refrigerant leak sensor to power the refrigerant leak sensor for a first predetermined period out of each second predetermined period; and disconnect the refrigerant leak sensor from power for the remainder of each second predetermined period, where the second predetermined period is greater than the first predetermined period.

In a feature, a sensor control method includes: by a refrigerant leak sensor, measuring an amount of a refrigerant present in air outside of a heat exchanger of a refrigeration system, where the heat exchanger is located within a building that is at least one of heated and cooled by the refrigeration system; and selectively disconnecting the refrigerant leak sensor from power when a blower that moves air past the heat exchanger is on.

In further features, the sensor control method further includes determining whether the blower is on when at least one of: a current to an electric motor of the blower is greater than a predetermined current; a voltage applied to an electric motor of the blower is greater than a predetermined voltage; a speed of an electric motor of the blower is greater than a predetermined speed; a pressure of air downstream of the heat exchanger is greater than a predetermined pressure; a temperature of air downstream of the heat exchanger is less than a predetermined temperature during cooling; the temperature of air downstream of the heat exchanger is greater than a predetermined temperature during heating; a humidity of air downstream of the heat exchanger is greater than a predetermined humidity; a flowrate of air through ducts is greater than a predetermined flowrate; and a command to turn the blower on is received.

In further features, the refrigerant is classified as mildly flammable.

In further features, the sensor control method further includes connecting the refrigerant leak sensor to power when the blower is off.

In further features, the sensor control method further includes, while the blower is off, connecting the refrigerant leak sensor to power for a first predetermined period out of each second predetermined period and disconnecting the refrigerant leak sensor from power for the remainder of each second predetermined period, where the second predetermined period is greater than the first predetermined period.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some refrigerants used in refrigeration systems may be classified as mildly flammable (e.g., A2L refrigerants). Refrigeration systems using mildly flammable refrigerant may include a refrigerant leak sensor configured to measure an amount of refrigerant that is present in air outside of the refrigeration system within a building served by the refrigeration system. This amount of refrigerant corresponds to an amount of refrigerant that has leaked out of the refrigeration system.

Refrigerant leak sensors may be pulsed on and off at a predetermined rate. Pulsing a refrigerant leak sensor on and off, however, may decrease a lifetime of the refrigerant leak sensor. For example, one or more optical components (e.g., a light bulb) of the refrigerant leak sensor may be damaged each time a refrigerant leak sensor is turned on. Pulsing the refrigerant leak sensor on and off may therefore decrease a lifetime of the refrigerant leak sensor.

According to the present application, a power control module may maintain the refrigerant leak sensor on continuously. This may increase a lifetime of the refrigerant leak sensor. Alternatively, the power control module may maintain the refrigerant leak sensor on and only turn the refrigerant leak sensor off at times when measurements from the refrigerant leak sensor are not needed, such as when a blower is on. The blower being on may mitigate any possible leak.

Figure 1:
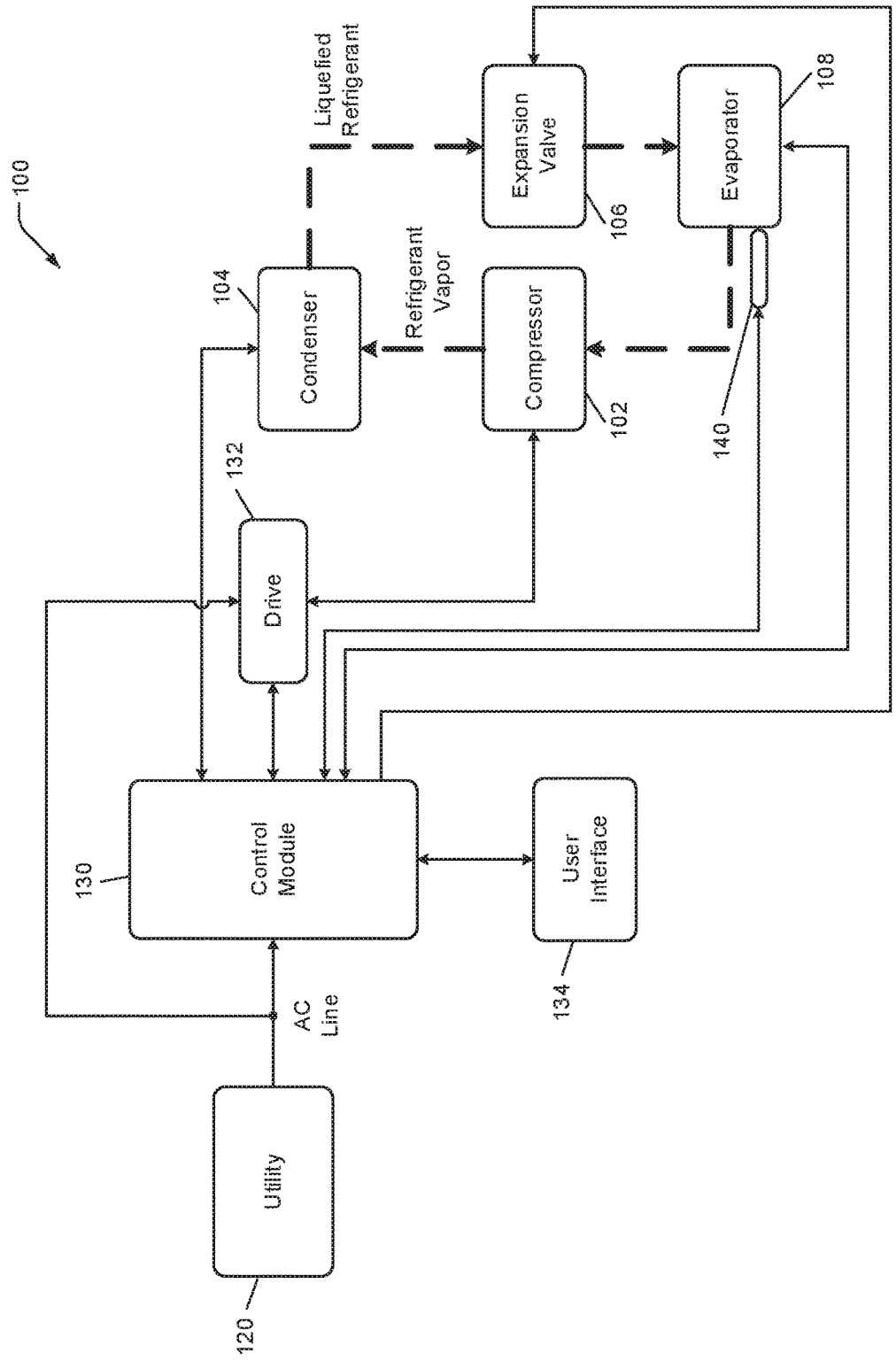
FIG. 1 is a functional block diagram of an example refrigeration system.

FIG. 1 is a functional block diagram of an example refrigeration system 100 including a compressor 102, a condenser 104, an expansion valve 106, and an evaporator 108. The refrigeration system 100 may include additional and/or alternative components, such as a reversing valve or a filter-drier. In addition, the present disclosure is applicable to other types of refrigeration systems including, but not limited to, heating, ventilating, and air conditioning (HVAC), heat pump, refrigeration, and chiller systems. For example, the refrigeration system 100 may include a reversing valve (not shown) that is configured to reverse a direction of refrigerant flow in a heat pump system.

The compressor 102 receives refrigerant in vapor form and compresses the refrigerant. The compressor 102 provides pressurized refrigerant in vapor form to the condenser 104. The compressor 102 includes an electric motor that drives a pump. For example only, the pump of the compressor 102 may include a scroll compressor and/or a reciprocating compressor.

All or a portion of the pressurized refrigerant is converted into liquid form within the condenser 104. The condenser 104 transfers heat away from the refrigerant, thereby cooling the refrigerant. When the refrigerant vapor is cooled to a temperature that is less than a saturation temperature, the refrigerant transforms into a liquid (or liquefied) refrigerant. The condenser 104 may include an electric fan that increases the rate of heat transfer away from the refrigerant.

The condenser 104 provides the refrigerant to the evaporator 108 via the expansion valve 106. The expansion valve 106 controls the flow rate at which the refrigerant is supplied to the evaporator 108. The expansion valve 106 may include a thermostatic expansion valve or may be controlled electronically by, for example, a control module 130. A pressure drop caused by the expansion valve 106 may cause a portion of the liquefied refrigerant to transform back into the vapor form. In this manner, the evaporator 108 may receive a mixture of refrigerant vapor and liquefied refrigerant.

The refrigerant absorbs heat in the evaporator 108. Liquid refrigerant transitions into vapor form when warmed to a temperature that is greater than the saturation temperature of the refrigerant. The evaporator 108 may include an electric fan that increases the rate of heat transfer to the refrigerant.

A utility 120 provides power to the refrigeration system 100. For example only, the utility 120 may provide single-phase alternating current (AC) power at approximately 230 Volts root mean squared ($V_{RMS}$). In other implementations, the utility 120 may provide three-phase AC power at approximately 400 $V_{RMS}$, 480 $V_{RMS}$, or 600 $V_{RMS}$ at a line frequency of, for example, 50 or 60 Hz. When the three-phase AC power is nominally 600 $V_{RMS}$, the actual available voltage of the power may be 575 $V_{RMS}$.

The utility 120 may provide the AC power to the control module 130 via an AC line, which includes two or more conductors. The AC power may also be provided to a drive 132 via the AC line. The control module 130 controls the refrigeration system 100. For example only, the control module 130 may control the refrigeration system 100 based on user inputs and/or parameters measured by various sensors (not shown). The sensors may include pressure sensors, temperature sensors, current sensors, voltage sensors, etc. The sensors may also include feedback information from the drive control, such as motor currents or torque, over a serial data bus or other suitable data buses.

A user interface 134 provides user inputs to the control module 130. The user interface 134 may additionally or alternatively provide the user inputs directly to the drive 132. The user inputs may include, for example, a desired temperature, requests regarding operation of a fan (e.g., a request for continuous operation of the evaporator fan), and/or other suitable inputs. The user interface 134 may take the form of a thermostat, and some or all functions of the control module (including, for example, actuating a heat source) may be incorporated into the thermostat.

The control module 130 may control operation of the fan of the condenser 104, the fan of the evaporator 108, and the expansion valve 106. The control module 130 may also control actuation of the reversing valve.

The drive 132 may control the compressor 102 based on commands from the control module 130. For example only, the control module 130 may instruct the drive 132 to operate the motor of the compressor 102 at a certain speed or to operate the compressor 102 at a certain capacity. In various implementations, the drive 132 may also control the condenser fan.

The evaporator 108 maybe located within a building served by the refrigeration system. The condenser 104 may be located outside of the building. In heat pump systems, the functions of the evaporator 108 and the condenser 104 are switched depending on whether heating is to be performed within the building or cooling is to be performed within the building. When cooling is performed, the condenser 104 and the evaporator 108 perform as described above. When heating is performed, coolant flow is reversed, and the condenser 104 and the evaporator 108 operate oppositely. The condenser 104 and the evaporator 108 may therefore be more generally referred to as heat exchangers.

A refrigerant leak sensor 140 is disposed inside of the building and measures an amount (e.g., concentration) of refrigerant in air (outside of the refrigeration system) present at the refrigerant leak sensor. The refrigerant leak sensor 140 may be located, for example, near the evaporator 108, such as downstream of a blower that blows air across the evaporator 108 and into the building through ducts. The refrigerant leak sensor 140 may also be located downstream of evaporator 108.

The refrigerant leak sensor 140 generates a signal based on the amount of refrigerant measured. For example, the refrigerant leak sensor 140 may transmit the amount of refrigerant to the control module 130. Alternatively, the refrigerant leak sensor 140 may set the signal to a first state when the amount is greater than a predetermined amount and set the signal to a second state when the amount is less than the predetermined amount. The predetermined amount may be, for example, 25 percent of a lower flammability level of the refrigerant or another suitable value. In various implementations, the refrigerant is classified under one or more standards as being mildly flammable. For example only, the refrigerant may be classified as an A2L refrigerant or more generally mildly flammable as discussed above. The classification may be, for example, by a standard of ASHRAE (American Society of Heating, Refrigerating and Air-Conditioning Engineers), UL (Underwriters Laboratory) 60335-2-40 standard, or in another standard which may be by ASHRAE, UL, or another regulatory body.

The control module 130 receives the output of the refrigerant leak sensor 140 which indicates that the amount of refrigerant is greater than the predetermined amount. One or more remedial actions may be taken when the output indicates that a leak is present (e.g., the signal indicates that the amount is greater than the predetermined value or the signal is in the first state). For example, the control module 130 may turn on the blower (that blows air across the evaporator 108) when a leak is present. Turning on the blower may disperse leaked refrigerant. Additionally, the control module 130 may turn off the compressor 102 and maintain the compressor 102 off until the leak is remediated. Additionally, the control module 130 may actuate lockout devices to prevent ignition by one or more ignition devices within the building. Additionally or alternatively, the control module 130 may close one or more isolation valves to isolate the refrigerant outside of the building.

Additionally or alternatively, the control module 130 may generate one or more indicators when a leak is present. For example, the control module 130 may transmit an indicator to one or more external devices, generate one or more visual indicators (e.g., turn on one or more lights, display information on one or more displays, etc.), and/or generate one or more audible indicators, such as via one or more speakers.

The refrigerant leak sensor 140 may be, for example, non dispersive infrared (NDIR) refrigerant sensor, a thermal conductivity refrigerant sensor, a quartz crystal microbalance (QCM) sensor, or another suitable type of refrigerant leak sensor. NDIR sensors include an infrared (IR) lamp that transmits light through a tube. A fan or blower may push or pull gas (e.g., air and, if a leak is present, refrigerant) through the tube. An optical sensor receives light from the IR lamp through the tube and measures the amount of refrigerant in the gas based on one or more characteristics of the light. A thermal conductivity sensor includes conductive plates between which the gas may be pushed or pulled by a blower or a fan. The blower or fan may be omitted in various implementations. Different amounts of refrigerant have different thermal conductivities. Thermal conductivity sensors include two temperature sensors (e.g., one before and one after a heating element). A thermal conductivity sensor determines a temperature difference between the measurements from the two sensors. Given a known heating input from the heating element, the thermal conductivity sensor determines the amount of the refrigerant based on the temperature difference. Different amounts of refrigerant have different densities and may therefore cause different vibrations. QCM sensors measure the amount of refrigerant in the gas based on the vibration. Other examples of refrigerant leak sensors 140 include metal oxide refrigerant sensors, acoustic refrigerant sensors, quartz resonation (e.g., QCM) refrigerant sensors, and carbon nanotube refrigerant sensors. Metal oxide refrigerant sensors measure a resistance across a surface oxidizer heated by a hotplate. In the presence of the refrigerant, the resistance of the oxidizing layer may decrease. As refrigerant dissipates, the resistance of the oxidizing layer may increase. A metal oxide refrigerant sensor may determine the amount of refrigerant based on the resistance.

To minimize power consumption of the refrigerant leak sensor 140, the control module 130 could toggle the refrigerant leak sensor 140 on and off for the same predetermined period. In other words, the control module 130 could pulse the refrigerant leak sensor 140 on and off, such as by directly applying and disconnecting the leak sensor 140 to and from power. The control module 130 turns the refrigerant leak sensor 140 on by applying power to the refrigerant leak sensor 140. The control module 130 turns the refrigerant leak sensor 140 off by disconnecting the refrigerant leak sensor 140 from power.

In various implementations, the refrigerant leak sensor 140 may be a digital sensor. In such implementations, the refrigerant leak sensor 140 may be configured to enter a standby (or reduced power/sleep) mode in response to receipt of a standby command from the control module 130. The control module 130 may toggle the refrigerant leak sensor 140 on and off by transitioning the refrigerant leak sensor 140 back and forth between the non-standby and standby states, respectively. The word "on" as used herein may refer to operation in a non-standby mode and, and the term "off" as used herein may refer to operation in the standby mode. Generally speaking, when turning the refrigerant leak sensor 140 off, the control module 130 may decrease power applied to a processor of the refrigerant leak sensor 140 (e.g., down to zero percent of peak power). When turning the refrigerant leak sensor 140 on, the control module 130 may apply power to a processor of the refrigerant leak sensor 140 (e.g., up to 100 percent of peak power).

Pulsing the refrigerant leak sensor 140 on and off, however, may damage the refrigerant leak sensor 140. For example, the IR lamp may deteriorate each time the IR lamp is turned on.

The present application involves the control module 130 controlling power to the refrigerant leak sensor 140 to increase a lifetime of the refrigerant leak sensor 140 relative to pulsing the refrigerant leak sensor 140 on and off. For example, the control module 130 may maintain the refrigerant leak sensor 140 on continuously. This may increase power consumption, but also increase a life of the refrigerant sensor. The cost associated with the life increase may outweigh the cost of the increased power consumption.

In various implementations, the control module 130 may only turn the refrigerant leak sensor 140 off (and otherwise maintain the refrigerant leak sensor 140 on) when one or more predetermined conditions are satisfied. For example, the control module 130 may turn the refrigerant leak sensor 140 off when the blower that blows air past the evaporator 108 is on (and any possible leak would be mitigated). The control module 130 may infer that the blower is on when the control module 130 has applied power to the blower (or transmitted a command) to turn the blower on. In various implementations, the control module 130 may turn or leave the refrigerant leak sensor 140 on when the blower is on and obtain one or more measurements, such as to verify that any leak is being dissipated/reduced.

In various implementations, one or more measured parameters may be used to determine whether the blower is on, and the control module 130 may turn the refrigerant leak sensor 140 off when the blower is on. For example, the control module 130 may determine whether the blower is on based on air pressure, air temperature, humidity of air, current of a motor of the blower, voltage of the motor of the blower, power consumption of the motor of the blower, a speed of the motor of the blower, and/or a flowrate of air output by the blower.

When transitioning the refrigerant leak sensor 140 from off to on or on to off, the control module 130 may vary the power applied to the refrigerant leak sensor 140. For example, the control module 130 may ramp down the power applied to the refrigerant leak sensor 140 when turning the refrigerant leak sensor 140 off. The control module 130 may ramp up the power applied to the refrigerant leak sensor 140 when turning the refrigerant leak sensor 140 on. While the example of ramping is described, the control module 130 may vary the power applied in another suitable pattern, such as sinusoidally, triangularly, predetermined increments, etc.

Figure 2:
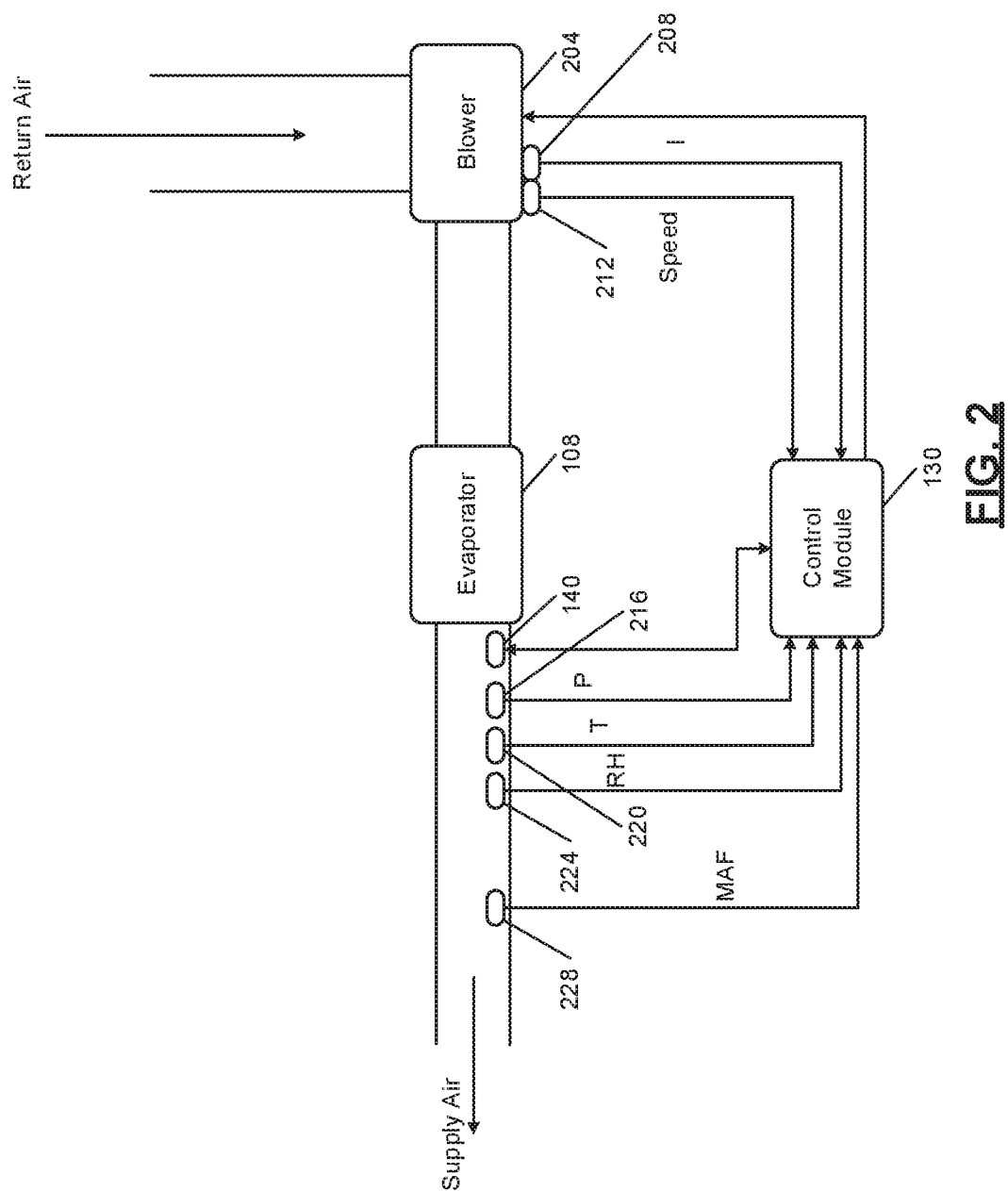
FIG. 2 is a functional block diagram of an example portion of the refrigeration system of FIG. 1.

FIG. 2 is a functional block diagram of an example portion of the refrigeration system of FIG. 1. When on, a blower 204 draws air in from within the building through one or more return air ducts. The blower 204 forces air past the evaporator 108. The evaporator 108 transfers heat to or from the air as the air passes the evaporator 108. Heated or cooled air flows from the evaporator 108 to within the building through one or more supply air ducts.

One or more sensors may be implemented in addition to the refrigerant leak sensor 140. For example, a motor current sensor 208 may measure current to the blower 204 and more specifically to an electric motor of the blower 204. The control module 130 may determine that the blower 204 is on (and turn off the refrigerant leak sensor 140) when the current is greater than a predetermined current.

Additionally or alternatively, a voltage sensor may measure a voltage applied to the electric motor of the blower 204. The control module 130 may determine that the blower 204 is on (and turn off the refrigerant leak sensor 140) when the voltage is greater than a predetermined voltage.

Additionally or alternatively, a power sensor may measure a power consumption of the electric motor of the blower 204. The control module 130 may determine that the blower 204 is on (and turn off the refrigerant leak sensor 140) when the power consumption is greater than a predetermined power.

Additionally or alternatively, a speed sensor 212 may measure a rotational speed of the electric motor of the blower 204. The control module 130 may determine that the blower 204 is on (and turn off the refrigerant leak sensor 140) when the speed is greater than a predetermined speed.

Additionally or alternatively, one or more sensors may be implemented downstream of the evaporator 108. For example, a pressure sensor 216 may measure a pressure of air downstream of the evaporator 108 (e.g., in a supply air duct). The control module 130 may determine that the blower 204 is on (and turn off the refrigerant leak sensor 140) when the pressure is greater than a predetermined pressure (e.g., a barometric pressure). The pressure may approach barometric pressure when the blower 204 is off. The pressure may increase relative to barometric pressure when the blower 204 is on.

Additionally or alternatively, a temperature sensor 220 may measure a temperature of air downstream of the evaporator 108 (e.g., in a supply air duct). The control module 130 may determine that the blower 204 is on (and turn off the refrigerant leak sensor 140) when the temperature is greater than a predetermined temperature (e.g., a setpoint pressure of the thermostat) during heating or less than the predetermined temperature during cooling.

Additionally or alternatively, a relative humidity sensor 224 may measure a relative humidity (RH) of air downstream of the evaporator 108 (e.g., in a supply air duct). The control module 130 may determine that the blower 204 is on (and turn off the refrigerant leak sensor 140) when the relative humidity is greater than or less than a predetermined relative humidity. Different predetermined relative humidities may be used for heating mode and cooling mode.

Additionally or alternatively, an air flowrate (e.g., mass air flowrate (MAF)) sensor 228 may measure a flowrate (e.g., a mass flowrate) of air downstream of the evaporator 108 (e.g., in a supply air duct). The control module 130 may determine that the blower 204 is on (and turn off the refrigerant leak sensor 140) when the air flowrate is greater than a predetermined air flowrate.

While example locations of sensors are provided in FIG. 2, the sensors may be located in other suitable locations. Additionally, one or more of the sensors of FIG. 2 may be omitted or duplicated.

Figure 3:
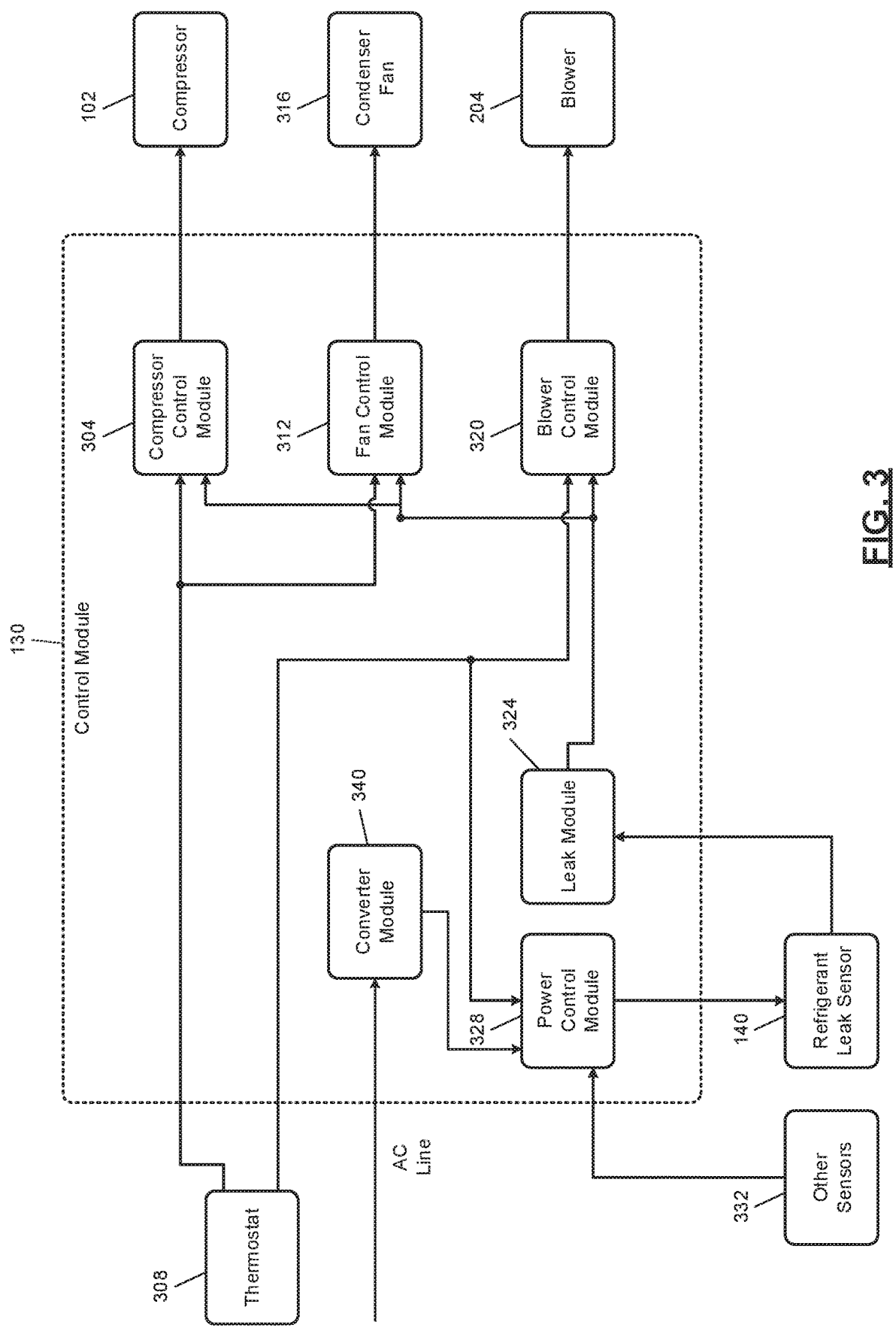
FIG. 3 is a functional block diagrams of example implementations of a control module.

FIG. 3 is a functional block diagram of an example implementation of the control module 130. A compressor control module 304 controls operation of the compressor 102. For example, the compressor control module 304 may turn on the compressor 102 in response to receipt of a command from a thermostat 308. The thermostat 308 may generate the command, for example, when a temperature of air within the building is greater than a setpoint temperature (in the example of cooling) or less than the setpoint temperature (in the example of heating). The compressor control module 304 may vary a speed and/or capacity of the compressor 102 when the compressor 102 is on. The compressor control module 304 may turn the compressor 102 off when the thermostat 308 stops generating the command.

A fan control module 312 controls operation of the condenser fan 316. The condenser fan 316 increases airflow past the condenser 104 when the condenser fan 316 is on. For example, the fan control module 312 may turn on the condenser fan 316 in response to receipt of the command from the thermostat 308. The fan control module 312 may turn the condenser fan 316 off when the thermostat 308 stops generating the command. In various implementations, the fan control module 312 may turn the condenser fan 316 on before the compressor 102 is turned on and maintain the condenser fan 316 on for a predetermined period after the compressor 102 is turned off.

A blower control module 320 controls operation of the blower 204. For example, the fan blower control module 320 may turn on the blower 204 in response to receipt of the command from the thermostat 308. The blower control module 320 may turn the blower 204 off when the thermostat 308 stops generating the command. In various implementations, the blower control module 320 may turn the blower 204 on before the compressor 102 is turned on and maintain the blower 204 on for a predetermined period after the compressor 102 is turned off.

The control modules discussed herein turn a device on by applying power to the device. The control modules turn a device off by disconnecting the device from power.

The blower control module 320 may also turn the blower 204 on when a refrigerant leak is detected using the refrigerant leak sensor 140. For example, a leak module 324 may determine that a refrigerant leak is present in the refrigeration system when the amount of refrigerant measured outside of the refrigeration system by the refrigerant leak sensor 140 is greater than a predetermined amount. The leak module 324 may determine that a refrigerant leak is not present when the amount is less than the predetermined amount.

One or more other remedial actions may be taken when a refrigerant leak is present in the refrigeration system, such as described above. For example, the compressor control module 304 may turn the compressor 102 off and maintain the compressor 102 off for a predetermined period when a refrigerant leak is present.

A power control module 328 controls the application of power to the refrigerant leak sensor 140. In other words, the power control module 328 turns the refrigerant leak sensor 140 on and off. In various implementations, the power control module 328 may maintain the refrigerant leak sensor 140 on continuously. Maintaining the refrigerant leak sensor 140 on continuously may increase a lifetime of the refrigerant leak sensor 140 relative to turning the refrigerant leak sensor 140 on and off.

Alternatively to maintaining the refrigerant leak sensor 140 on continuously, the power control module 328 may turn the refrigerant leak sensor 140 on and off. For example, a requirement of one or more regulatory bodies (e.g., Underwriters Laboratories, UL) may require that a refrigerant leak sensor detect a leak within a predetermined maximum period of the leak beginning. The refrigerant leak sensor 140, however, may be capable of generating reliable measurements within a predetermined measurement period after being turned on. The predetermined measurement period is less than the predetermined maximum period. The power control module 328 may therefore turn the refrigerant leak sensor 140 on continuously for the predetermined measurement period out of each predetermined maximum period. The power control module 328 may maintain the refrigerant leak sensor 140 off otherwise. This may satisfy the requirement of the regulatory body(ies) while minimizing the period that the refrigerant leak sensor 140 is on. The predetermined maximum period is set by the regulatory body and may be, for example, 10 seconds or another suitable period. The predetermined measurement period may be, for example, 2 seconds or another suitable period for the refrigerant leak sensor 140 to generate accurate measurements. The predetermined measurement period may be determined, for example, experimentally or specified, for example, by a manufacturer of the refrigerant leak sensor 140.

Additionally or alternatively, the power control module 328 may turn the refrigerant leak sensor 140 off when the blower 204 is on (e.g., as indicated by the command from the thermostat 308). The power control module 328 may maintain the refrigerant leak sensor 140 on otherwise (e.g., when the blower 204 is off).

In various implementations, the power control module 328 may determine whether the blower 204 is on (or verify that the blower 204 is on) based on one or more measurements from one or more of the other sensors 332 mentioned above and turn the refrigerant leak sensor 140 off when the blower 204 is on. For example, the power control module 328 may turn off the refrigerant leak sensor 140 when the current to the motor measured using the current sensor 208 is greater than the predetermined current.

Additionally or alternatively, the power control module 328 may turn off the refrigerant leak sensor 140 when the voltage to the electric motor of the blower 204 is greater than the predetermined voltage. Additionally or alternatively, the power control module 328 may turn off the refrigerant leak sensor 140 when the speed of the electric motor of the blower 204 measured using the speed sensor 212 is greater than the predetermined speed.

Additionally or alternatively, the power control module 328 may turn off the refrigerant leak sensor 140 when the pressure measured using the pressure sensor 216 is greater than the predetermined pressure. Additionally or alternatively, the power control module 328 may turn off the refrigerant leak sensor 140 when the temperature measured by the temperature sensor 220 is greater than the predetermined temperature during heating or less than the predetermined temperature during cooling. Additionally or alternatively, the power control module 328 may turn off the refrigerant leak sensor 140 when the relative humidity measured by the relative humidity sensor 224 is greater than or less than the predetermined relative humidity selected for the current mode (e.g., heating or cooling mode). Additionally or alternatively, the power control module 328 may turn off the refrigerant leak sensor 140 when the air flowrate measured by the air flowrate sensor 228 is greater than the predetermined air flowrate. Turning the refrigerant leak sensor 140 off when the blower 204 is on may increase a lifetime of the refrigerant leak sensor 140.

The power control module 328 may apply power from the AC line to the refrigerant leak sensor 140. In various implementations, a converter module 340 may convert the AC line into power suitable for application to the refrigerant leak sensor 140, and the power control module 328 may apply power output by the converter module to the refrigerant leak sensor 140. For example, the power control module 328 may include one or more switches. The power control module 328 may close the switch(es) to apply power to the refrigerant leak sensor 140. The power control module 328 may open the switch(es) to disconnect the refrigerant leak sensor 140 from power. In various implementations, the power control module 328 may control powering of the processor of the refrigerant leak sensor 140.

Figure 4:
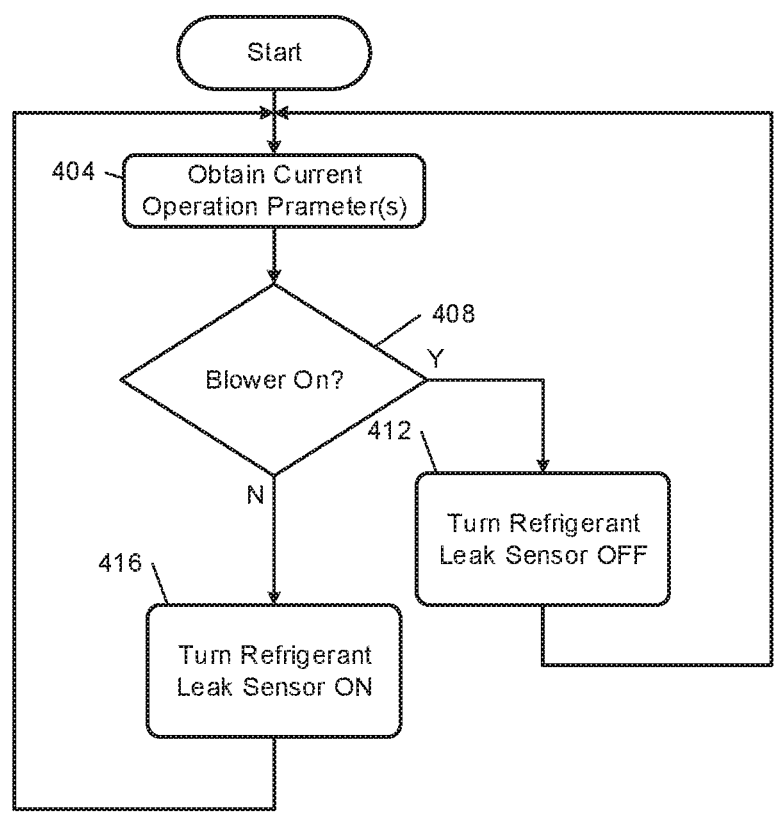
FIGS. 4 and 5 are flowcharts depicting example methods of controlling powering of a refrigerant leak sensor.

FIG. 4 is a flowchart depicting an example method of controlling powering of the refrigerant leak sensor 140. In various implementations, the power control module 328 may maintain the refrigerant leak sensor 140 on continuously. Alternatively, at 404 the power control module 328 may obtain one or more current operating parameters, such as the command regarding the blower 204, the current to the blower 204, the voltage applied to the blower 204, a power consumption of the blower 204, a speed of the blower 204, a pressure of air downstream of the evaporator 108, a temperature of air downstream of the evaporator 108, a relative humidity of air downstream of the evaporator 108, and an air flowrate through the ducts of the refrigeration system.

At 408, the power control module 328 determines whether the blower 204 is on. For example, the power control module 328 may determine that the blower 204 is on when the command to turn the blower 204 on is received from the thermostat. Additionally or alternatively, the power control module 328 may determine that the blower 204 is on when the current to the motor measured using the current sensor 208 is greater than the predetermined current. Additionally or alternatively, the power control module 328 may determine that the blower 204 is on when the voltage to the electric motor of the blower 204 is greater than the predetermined voltage. Additionally or alternatively, the power control module 328 may determine that the blower 204 is on when the speed of the electric motor of the blower 204 measured using the speed sensor 212 is greater than the predetermined speed. Additionally or alternatively, the power control module 328 may determine that the blower 204 is on when the pressure measured using the pressure sensor 216 is greater than the predetermined pressure. Additionally or alternatively, the power control module 328 may determine that the blower 204 is on when the temperature measured by the temperature sensor 220 is greater than the predetermined temperature during heating or less than the predetermined temperature during cooling. Additionally or alternatively, the power control module 328 may determine that the blower 204 is on when the relative humidity measured by the relative humidity sensor 224 is greater than or less than the predetermined relative humidity. Additionally or alternatively, the power control module 328 may determine that the blower 204 is on when the air flowrate measured by the air flowrate sensor 228 is greater than the predetermined air flowrate.

If 408 is true, the power control module 328 turns the refrigerant leak sensor 140 off at 412, and control returns to 404. If 408 is false, the power control module 328 may turn the refrigerant leak sensor 140 on at 416, and control may return to 404.

Figure 5:
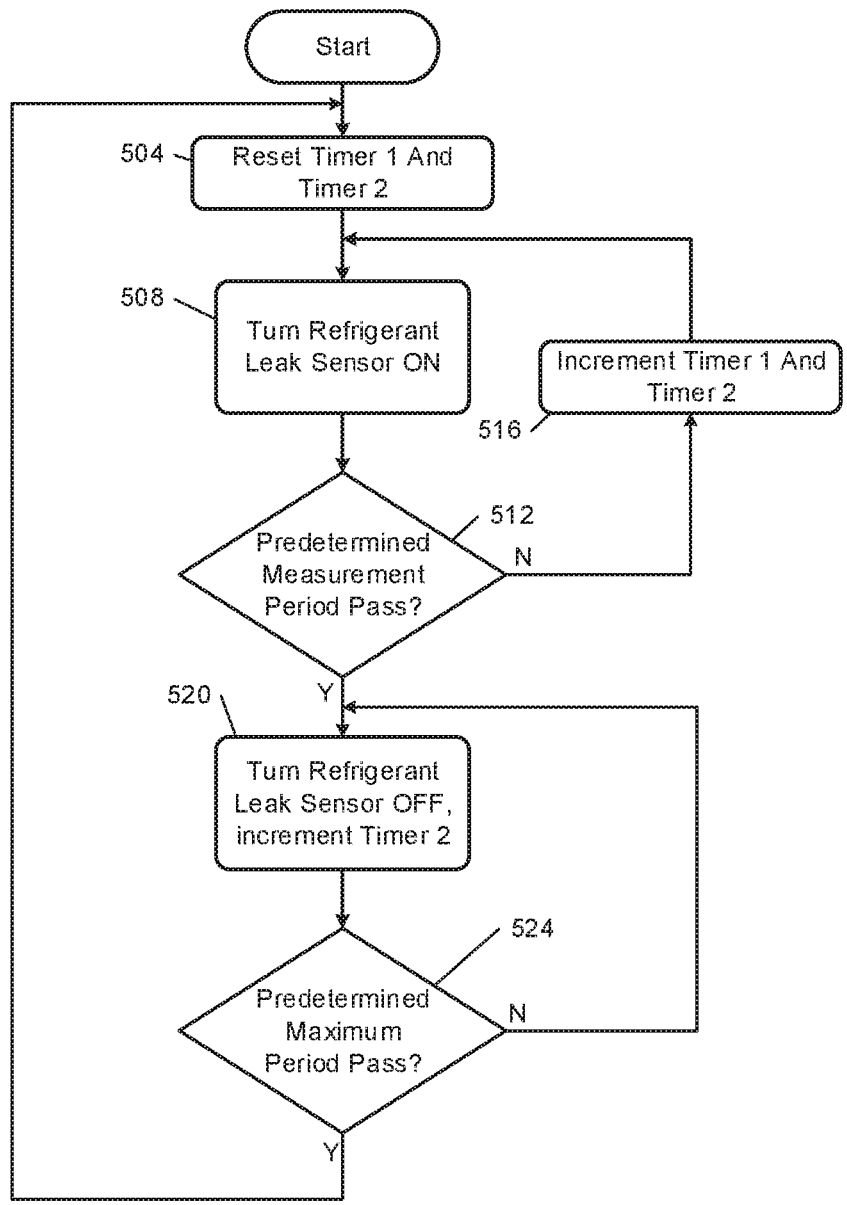

FIG. 5 is a flowchart depicting an example method of controlling powering of the refrigerant leak sensor 140. In various implementations, the power control module 328 may maintain the refrigerant leak sensor 140 on continuously. Alternatively, at 504 the power control module 328 may reset first and second timers (Timer 1 and Timer 2). At 508, the power control module 328 turns (or maintains) on the refrigerant leak sensor 140. The first timer tracks the period that the refrigerant leak sensor 140 has been on. The second timer tracks the period since the refrigerant leak sensor 140 was last turned on.

At 512, the power control module 328 determines whether the predetermined measurement period of the refrigerant leak sensor 140 has passed since the refrigerant leak sensor 140 was last turned on. For example, the power control module 328 may determine whether the first timer is greater than the predetermined measurement period. If 512 is false, the power control module 328 increments the first and second timers at 516, and control returns to 508. In this manner, the power control module 328 maintains the refrigerant leak sensor 140 on for the predetermined measurement period. If 512 is false, control continues with 520.

At 520, the power control module 328 turns (or maintains) off the refrigerant leak sensor 140 and increments the second timer. At 524, the power control module 328 determines whether the predetermined maximum period has passed since the refrigerant leak sensor 140 was last turned on. For example, the power control module 328 may determine whether the second timer is greater than the predetermined maximum period. If 524 is false, the power control module 328 control returns to 520. In this manner, the power control module 328 maintains the refrigerant leak sensor 140 off for the remainder of the predetermined maximum period. If 524 is true, control returns to 504.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A sensor control system, comprising:
    a refrigerant leak sensor configured to, when powered, measure an amount of a refrigerant present in air outside of a heat exchanger of a refrigeration system, wherein the heat exchanger is located within a building that is at least one of heated and cooled by the refrigeration system; and
    a power control module configured to disconnect the refrigerant leak sensor from power when a blower that moves air past the heat exchanger is on,
    wherein the power control module is configured to determine that the blower is on when a humidity of air downstream of the heat exchanger is greater than a predetermined humidity.

2. The sensor control system of claim 1 wherein the power control module is further configured to determine that the blower is on when a current to an electric motor of the blower is greater than a predetermined current.

3. The sensor control system of claim 1 wherein the power control module is further configured to determine that the blower is on when a voltage applied to an electric motor of the blower is greater than a predetermined voltage.

4. The sensor control system of claim 1 wherein the power control module is further configured to determine that the blower is on when a speed of an electric motor of the blower is greater than a predetermined speed.

5. The sensor control system of claim 1 wherein the power control module is further configured to determine that the blower is on when a pressure of air downstream of the heat exchanger is greater than a predetermined pressure.

6. The sensor control system of claim 1 wherein the power control module is further configured to determine that the blower is on when a temperature of air downstream of the heat exchanger is less than a predetermined temperature during cooling.

7. The sensor control system of claim 1 wherein the power control module is further configured to determine that the blower is on when a temperature of air downstream of the heat exchanger is greater than a predetermined temperature during heating.

8. The sensor control system of claim 1 wherein the power control module is further configured to determine that the blower is on when a flowrate of air through ducts is greater than a predetermined flowrate.

9. The sensor control system of claim 1 wherein the power control module is further configured to determine that the blower is on when a command to turn the blower on is received.

10. The sensor control system of claim 1 wherein the refrigerant is classified as mildly flammable.

11. The sensor control system of claim 1 wherein the power control module is further configured to connect the refrigerant leak sensor to power when the blower is off.

12. The sensor control system of claim 11 wherein the power control module is further configured to, while the blower is off, connect the refrigerant leak sensor to power for a first predetermined period out of each second predetermined period and to disconnect the refrigerant leak sensor from power for the remainder of each second predetermined period,
wherein the second predetermined period is greater than the first predetermined period.

13. A sensor control system, comprising:
a refrigerant leak sensor configured to, when powered, measure an amount of a refrigerant present in air outside of a heat exchanger of a refrigeration system,
wherein the heat exchanger is located within a building that is at least one of heated and cooled by the refrigeration system; and
a power control module configured to one of (a) and (b):
(a) including continuously power the refrigerant leak sensor and not disconnect the refrigerant leak sensor from power while power is received by the power control module; and
(b) including:
(b1) connect the refrigerant leak sensor to power the refrigerant leak sensor for a first predetermined period out of each second predetermined period; and
(b2) disconnect the refrigerant leak sensor from power for the remainder of each second predetermined period,
wherein the second predetermined period is greater than the first predetermined period.

14. A sensor control method, comprising:
by a refrigerant leak sensor, measuring an amount of a refrigerant present in air outside of a heat exchanger of a refrigeration system,
wherein the heat exchanger is located within a building that is at least one of heated and cooled by the refrigeration system;
selectively disconnecting the refrigerant leak sensor from power when a blower that moves air past the heat exchanger is on;
connecting the refrigerant leak sensor to power when the blower is off; and
while the blower is off, connecting the refrigerant leak sensor to power for a first predetermined period out of each second predetermined period and disconnecting the refrigerant leak sensor from power for the remainder of each second predetermined period.

15. The sensor control method of claim 14 further comprising determining whether the blower is on when at least one of:
a current to an electric motor of the blower is greater than a predetermined current;
a voltage applied to an electric motor of the blower is greater than a predetermined voltage;
a speed of an electric motor of the blower is greater than a predetermined speed;
a pressure of air downstream of the heat exchanger is greater than a predetermined pressure;
a temperature of air downstream of the heat exchanger is less than a predetermined temperature during cooling;
the temperature of air downstream of the heat exchanger is greater than a predetermined temperature during heating;
a humidity of air downstream of the heat exchanger is greater than a predetermined humidity;
a flowrate of air through ducts is greater than a predetermined flowrate; and
a command to turn the blower on is received.

16. The sensor control method of claim 14 wherein the refrigerant is classified as mildly flammable.

17. The sensor control system of claim 13 wherein the refrigerant is classified as mildly flammable.

18. A sensor control system, comprising:
a refrigerant leak sensor configured to, when powered, measure an amount of a refrigerant present in air outside of a heat exchanger of a refrigeration system,
wherein the heat exchanger is located within a building that is at least one of heated and cooled by the refrigeration system; and
a power control module configured to disconnect the refrigerant leak sensor from power when a blower that moves air past the heat exchanger is on,
wherein the power control module is configured to connect the refrigerant leak sensor to power when the blower is off, and
wherein the power control module is configured to, while the blower is off, connect the refrigerant leak sensor to power for a first predetermined period out of each second predetermined period and to disconnect the refrigerant leak sensor from power for the remainder of each second predetermined period,
wherein the second predetermined period is greater than the first predetermined period.

* * * * *